March 15, 1932. W. K. MELROSE ET AL 1,849,998
PROCESS FOR THE PRODUCTION OF SUGAR FROM DRIED BEETS
Filed May 15, 1928
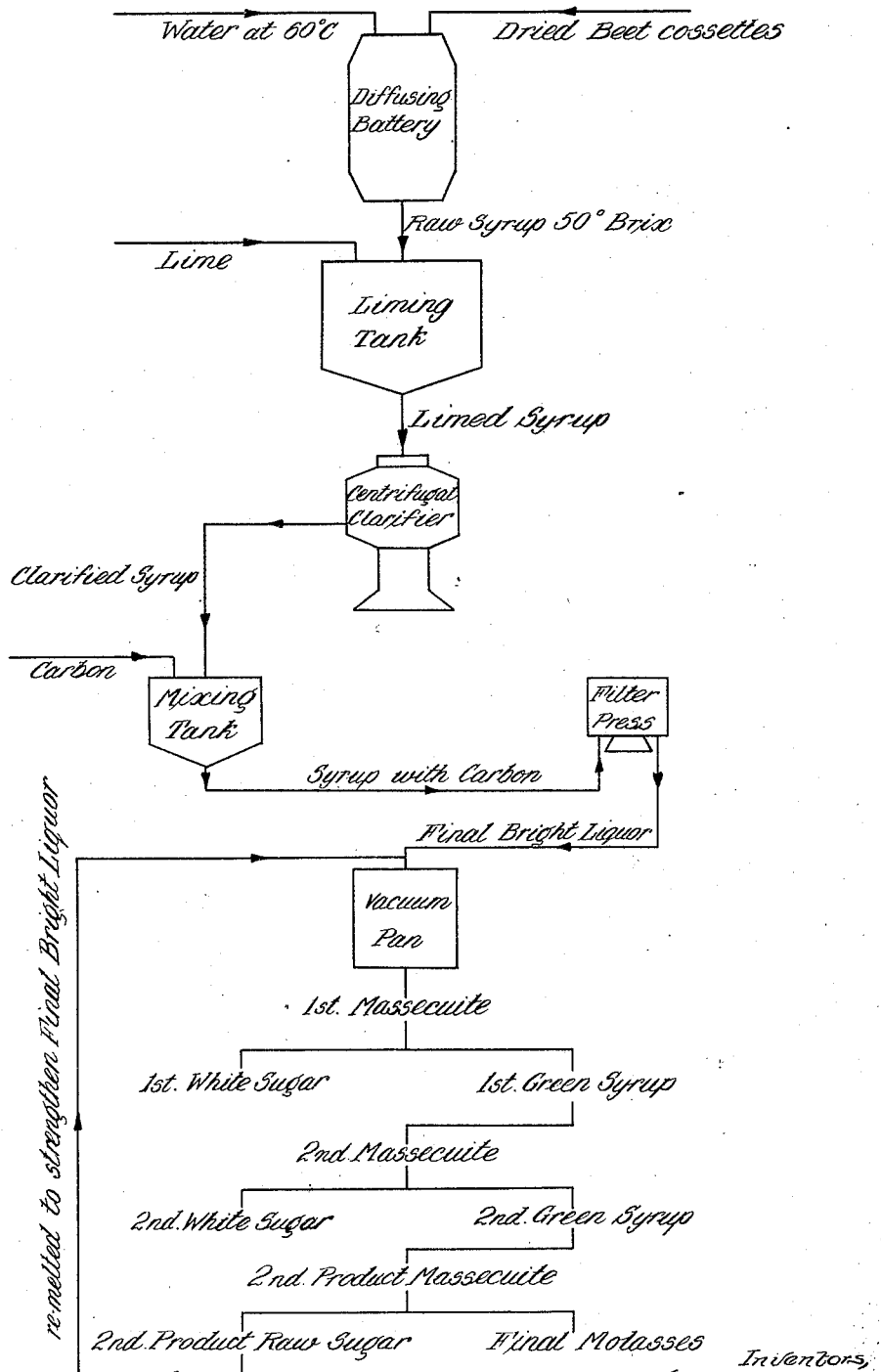
Inventors,
W. K. Melrose
J. C. Stead
by Ruege Boyce & Bakelar
Attorneys.

Patented Mar. 15, 1932

1,849,998

UNITED STATES PATENT OFFICE

WILLIAM KINNEAR MELROSE AND JOHN CHRISTOPHER STEAD, OF LONDON, ENGLAND, ASSIGNORS TO SUGAR BEET AND CROP DRIERS LIMITED, OF LONDON, ENGLAND, A BRITISH COMPANY

PROCESS FOR THE PRODUCTION OF SUGAR FROM DRIED BEETS

Application filed May 15, 1928, Serial No. 278,050, and in Great Britain May 24, 1927.

The present invention relates to an improved process for the production of sugar from dried beet, and has for its object to simplify and expedite the treatment of the sugar juice or syrup obtained on extraction and to produce a final liquor of good purity and brilliancy capable of yielding a considerably larger proportion of first-grade white sugar than that obtainable in the case of the processes heretofore proposed.

It is well known that raw syrups of relatively high density or viscosity are initially obtained from beets which have been previously dried to a comparatively low moisture-content. It has been proven, in this connection, that dried beet, when satisfactorily desiccated, is capable of yielding a strong initial syrup containing from 50 to 55 per cent of sugar. It has been found, however, that the proportionately larger percentage of slimy and other suspended or undissolved matters present in such dense or strong syrups renders the subsequent treatment thereof considerably more difficult and troublesome as compared with that of the thinner or weaker juices usually obtained from raw or fresh beets.

A further object of the said invention is to enable the treatment of strong sugar syrups as aforesaid to be effected with greater facility and with better results than has hitherto been the case.

In the accompanying drawing the figure discloses a flow sheet for the process forming this invention.

The process according to this invention consists essentially in diffusing the sugar-content of dried beet in sliced or disintegrated form by means of warm water at a temperature of 50 to 70 degrees centigrade, in treating the diffused raw syrup at approximately the same temperature with a quantity of lime calculated to precipitate the dissolved impurities in the subsequently clarified syrup and to render the said syrup slightly alkaline, and in clarifying the syrup so treated by mechanical means adapted to separate the precipitated and suspended impurities present, thereby producing a liquor which, but for a simple final filtration, is otherwise ready without further treatment for boiling and graining to a good-class white sugar. Preferably, the syrup purified and clarified as aforesaid, prior to the final filtration thereof, is first strengthened by the addition thereto of melted low-grade or second-product sugar and is then decolorized by means of suitable activated carbon.

The extraction of the raw syrup may be effected by treating the dried beet in a series or battery of diffusion cells or vessels such as those ordinarily employed in the manufacture of sugar from raw or fresh beets, or in an apparatus adapted to effect a continuous extraction of the said raw syrup. The insolubility of the albuminoid matters produced by previous drying, however, enables the diffusing operation to be carried out at an appreciably lower temperature, with the result that the non-sugars are less liable to be extracted and that a generally purer syrup is obtained. The diffusing operation can thus be satisfactorily and effectively conducted at the above-stated range of temperature, as compared with the temperature of 80 degrees centigrade which is usually utilized for the diffusion of the sugar-content of raw or fresh beets.

The treatment of the raw syrup as aforesaid by the addition thereto of a quantity of lime equivalent to 0.08 to 0.16 per cent of the weight of raw or fresh beet will produce, in most cases, the necessary reactions and the requisite degree of alkalinity. The subsequent clarifying operation may be conducted in any suitable centrifugal separator adapted to remove the suspended and precipitated impurities present in the syrup under treatment. By thus treating the raw syrup prior to clarification, the quantity of lime utilized is considerably reduced and a troublesome filtration which would otherwise be necessary is advantageously eliminated. Further, owing to the subsequent removal of the impurities which would otherwise require a certain amount of lime and add to the difficulties of filtration, the purification of the syrup is greatly simplified, the liability to loss of sugar is appreciably reduced, and the employment of filter-presses is entirely eliminated.

The purified and clarified syrup is preferably strengthened to a sugar-content in the neighborhood of say 60 to 65 per cent by the addition thereto of low-grade or second-product sugar to an extent which chiefly depends on the available quantity of the product and which may vary from 55 to 65 per cent according to particular circumstances. It will be found that the strong initial syrup obtained as aforesaid affords an excellent medium for working-up the low-grade raw sugars produced during the course of manufacture which would ordinarily have to be re-melted and treated separately. The strengthening operation as aforesaid produces the further beneficial effect of increasing the purity of the syrup, without however entailing any addition thereto of further water and necessitating any extra or prolonged evaporation.

A revivifiable carbon of any suitable nature may be advantageously utilized for decolorizing the strengthened syrup, the carbon being added to and mixed with the said juice at a relatively high temperature and the syrup so treated being finally filtered. The quantity of activated carbon employed is mainly governed by the quality of the syrup under treatment as dependent upon the quality of the particular beets, and may vary according to circumstances from 2 to 4 per cent of the weight of total solid matters present in the said syrup. The carbon treatment as aforesaid, besides decolorizing the syrup, removes the ash and the colloidal matters in suspension therein, and thus purifies the said syrup to a further extent.

By means of the process in accordance with the present invention and owing to the improved and simplified treatment of the initial raw syrup, the number of operations heretofore necessary for the production of sugar from beet is considerably curtailed, the total sugar lost in the whole treatment is appreciably reduced, and a final liquor is produced from which a greater yield of first-product white sugar is readily obtained with a minimum of remelts and molasses. The green syrup obtained from the first strike of white sugar can be re-boiled to produce a second strike of white sugar, and the green syrup resulting from the purging of the said second strike can again be boiled to produce a final molasses of low purity and a second-product raw sugar, which latter is continuously available for re-melting in the purified and clarified syrup as hereinbefore described. It is thus possible, by such a system of after-treatment, to produce a sufficient quantity of second-grade sugars for increasing the strength of the original syrup by 5 to 10 degrees Brix, with the result that the final liquor passing to the vacuum-pans for boiling has a degree of concentration comparing favourably with that of the thick juice obtained from the multiple-effect evaporators usually employed in connection with the concentration of the weak initial juice derived from raw or fresh beets.

We claim:—

1. A process for the production of sugar from dried beet, consisting in diffusing the sugar-content of the material in disintegrated form by means of warm water at a temperature of 50 to 70 degrees centigrade, in treating the diffused raw syrup at approximately the same temperature by the addition thereto of a quantity of lime equivalent to 0.08 to 0.16 per cent of the weight of fresh material, in clarifying the syrup so treated by mechanical means adapted to separate the precipitated and suspended impurities present, in filtering the liquor thus obtained, and in boiling and graining the final liquor, thereby producing a strike of good-class white sugar.

2. A process for the production of sugar from dried beet, consisting in diffusing the sugar-content of the material in disintegrated form by means of warm water at a temperature of 50 to 70 degrees centigrade, in treating the diffused raw syrup at approximately the same temperature with a quantity of lime calculated to precipitate the dissolved impurities in the subsequently clarified syrup and to render the said syrup slightly alkaline, in clarifying the syrup so treated by mechanical means adapted to separate the precipitated and suspended impurities present, in strengthening the sugar-content of the liquor thus obtained by the addition thereto of melted second-product sugar, in filtering the final liquor, and in boiling and graining the said final liquor, thereby producing a strike of good-class white sugar.

3. A process for the production of sugar from dried beet, consisting in diffusing the sugar-content of the material in disintegrated form by means of warm water at a temperature of 50 to 70 degrees centigrade, in treating the diffused raw syrup at approximately the same temperature by the addition thereto of a quantity of lime equivalent to 0.08 to 0.16 per cent of the weight of fresh material, in clarifying the syrup so treated by mechanical means adapted to separate the precipitated and suspended impurities present, in strengthening the sugar-content of the liquor thus obtained by the addition thereto of 55 to 65 per cent of melted second-product sugar, in filtering the final liquor, and in boiling and graining the said final liquor, thereby producing a strike of good-class white sugar.

4. A process for the production of sugar from dried beet, consisting in diffusing the sugar-content of the material in disintegrated form by means of warm water at a temperature of 50 to 70 degrees centigrade, in treating the diffused raw syrup at approximately the same temperature with a quantity of lime calculated to precipitate the dissolved impurities in the subsequently clarified syrup and to render the said syrup slightly alkaline, in clarifying the syrup so treated by mechanical means adapted to separate the precipitated and suspended impurities present, in decolorizing the liquor thus obtained by the addition thereto of an activated carbon of a revivifiable nature, in filtering the final liquor, and in boiling and graining the said final liquor, thereby producing a strike of good-class white sugar.

5. A process for the production of sugar from dried beet, consisting in diffusing the sugar-content of the material in disintegrated form by means of warm water at a temperature of 50 to 70 degrees centigrade, in treating the diffused raw syrup at approximately the same temperature by the addition thereto of a quantity of lime equivalent to 0.08 to 0.16 per cent of the weight of fresh material, in clarifying the syrup so treated by mechanical means adapted to separate the precipitated and suspended impurities present, in decolorizing the liquor thus obtained by the addition thereto of an activated carbon of a revivifiable nature in a proportion of 2 to 4 per cent of the weight of total solid matters present in the said liquor, in filtering the final liquor, and in boiling and graining the said final liquor, thereby producing a strike of good-class white sugar.

6. A process for the production of sugar from dried beet, consisting in diffusing the sugar-content of the material in disintegrated form by means of warm water at a temperature of 50 to 70 degrees centigrade, in treating the diffused raw syrup at approximately the same temperature with a quantity of lime calculated to precipitate the dissolved impurities in the subsequently clarified syrup and to render the said syrup slightly alkaline, in clarifying the syrup so treated by mechanical means adapted to separate the precipitated and suspended impurities present, in strengthening the sugar-content of the liquor thus obtained by the addition thereto of melted second-product sugar, in decolorizing the liquor so strengthened by the addition thereto of an activated carbon of a revivifiable nature, in filtering the final liquor, and in graining and boiling the said final liquor, thereby producing a strike of good-class white sugar.

7. A process for the production of sugar from dried beet, consisting in diffusing the sugar-content of the material in disintegrated form by means of warm water at a temperature of 50 to 70 degrees centigrade, in treating the diffused raw syrup at approximately the same temperature by the addition thereto of a quantity of lime equivalent to 0.08 to 0.16 per cent of the weight of fresh material, in clarifying the syrup so treated by mechanical means adapted to separate the precipitated and suspended impurities present, in strengthening the sugar-content of the liquor thus obtained by the addition thereto of 55 to 65 per cent of melted second-product sugar, in decolorizing the liquor so strengthened by the addition thereto of an activated carbon of a revivifiable nature in a proportion of 2 to 4 per cent of the weight of total solid matters present in said liquor, in filtering the final liquor, and in graining and boiling the said final liquor, thereby producing a strike of good-class white sugar.

8. A process for the production of sugar from dried beet, consisting in diffusing the sugar-content of the material in disintegrated form by means of warm water at a temperature of 50 to 70 degrees centigrade, in treating the diffused raw syrup at approximately the same temperature with a quantity of lime calculated to precipitate the dissolved impurities in the subsequently clarified syrup and to render the said syrup slightly alkaline, in clarifying the syrup so treated by mechanical means adapted to separate the precipitated and suspended impurities present, in filtering the liquor thus obtained, in boiling and graining the final liquor to produce a first strike of white sugar, in re-boiling the green syrup obtained from the said first strike of white sugar to produce a second strike of white sugar, in boiling the green syrup resulting from the purging of the said second strike of white sugar to produce a second-product raw sugar, and in continuously re-melting the said second-product raw sugar in the said final liquor during the course of manufacture.

9. A process for the production of sugar from dried beet, consisting in diffusing the sugar-content of the material in disintegrated form by means of warm water at a temperature of 50 to 70 degrees centigrade, in treating the diffused raw syrup at approximately the same temperature with a quantity of lime calculated to precipitate the dissolved impurities in the subsequently clarified syrup and to render the said syrup slightly alkaline, in clarifying the syrup so treated by mechanical means adapted to separate the precipitated and suspended impurities present, in decolorizing the liquor thus obtained by the addition thereto of an activated carbon of a revivifiable nature, in filtering the final liquor, in boiling and graining the said final liquor to produce a first strike of white sugar, in re-boiling the green syrup obtained from the said first strike of white sugar to produce a second strike of white sugar, in boiling the green syrup resulting from the purging of the said second strike of white sugar to produce a second-product raw sugar, and in continuously re-melting the said second-product raw sugar in the said final liquor during the course of manufacture.

10. A process for the production of sugar from dried beet, comprising diffusing the sugar content from dried beet by means of water at temperatures between 50° and 70° C.; prior to clarification adding lime in quantity sufficient to precipitate dissolved impurities from the diffused raw syrup, and to render said syrup slightly alkaline; clarifying the syrup so treated by centrifugal separation of suspended impurities; filtering the clarified liquor thus obtained in the presence of a decolorizing agent; and boiling and graining the final liquor.

In testimony whereof we have signed our names to this specification.

WILLIAM KINNEAR MELROSE.
JOHN CHRISTOPHER STEAD.